US012800068B2

(12) United States Patent
Littlestar et al.

(10) Patent No.: US 12,800,068 B2
(45) Date of Patent: Nov. 17, 2026

(54) METHOD AND APPARATUS FOR ACHIEVING ZERO EMISSIONS OF GASEOUS SUBSTANCES IN RTP PIPELINES AND CONDUITS

(71) Applicant: SMART PIPE COMPANY INC., Houston, TX (US)

(72) Inventors: Gary Dean Littlestar, Houston, TX (US); Christopher Dean Littlestar, Houston, TX (US); Ivan Capistran Mandich, Houston, TX (US); Aron Robert Ekelund, Houston, TX (US); Justin Reed, Houston, TX (US); Robin Mcintosh, Houston, TX (US); Donny Mccallum, Houston, TX (US); Mark Malacord, Houston, TX (US)

(73) Assignee: SMART PIPE COMPANY, INC., Houston, TX (US)

( * ) Notice: Subject to any disclaimer, the term of this patent is extended or adjusted under 35 U.S.C. 154(b) by 631 days.

(21) Appl. No.: 18/207,608

(22) Filed: Jun. 8, 2023

(65) Prior Publication Data

US 2023/0400125 A1 Dec. 14, 2023

Related U.S. Application Data

(60) Provisional application No. 63/350,228, filed on Jun. 8, 2022.

(51) Int. Cl.

| | |
|---|---|
| ***F16L 9/18*** | (2006.01) |
| ***F16L 9/02*** | (2006.01) |
| ***F16L 55/00*** | (2006.01) |

(52) U.S. Cl.
CPC .................. *F16L 9/18* (2013.01); *F16L 9/02* (2013.01); *F16L 55/00* (2013.01)

(58) Field of Classification Search
CPC ................ F16L 9/18; F16L 9/02; F16L 55/00
See application file for complete search history.

(56) References Cited

U.S. PATENT DOCUMENTS

| | | | | |
|---|---|---|---|---|
| 5,551,484 A * | 9/1996 | Charboneau ........ | G01M 5/0033 138/104 |
| 5,829,483 A * | 11/1998 | Tukahara ................. | F16L 9/18 138/121 |

(Continued)

*Primary Examiner* — David R Deal
(74) *Attorney, Agent, or Firm* — Juan J. Lizarraga

(57) ABSTRACT

A method, device and processing system for a G-ZED "Gaseous Zero Emissions Device" for the inspection, detection and management of gaseous permeation through composite pipe structures, termed Reinforced Thermoplastic Pipe, non-metallic or partially metallic composite pipelines and conduits, or cured type structure, and instrumented with inventive monitoring, inspection and communication systems, prefabricated, and delivered for installation, in existing lined or free-standing pipes with minimal disturbance to the operation of such pipelines. The device has a cylindrical gas chamber surrounding a portion of a continuous multi-layered composite pipe to capture permeated gas directed into the gas chamber and then to a compression chamber for pressure separation, reclamation and reinjection into the pipeline gas flow or to storage. The device is monitored and controlled through individual embedded sensors, reader/activator fiber optic sensing and transmission, data transmission and a computer system for receiving and processing information.

10 Claims, 7 Drawing Sheets

(56) References Cited

U.S. PATENT DOCUMENTS

| | | | | | |
|---|---|---|---|---|---|
| 5,865,216 | A * | 2/1999 | Youngs | F16L 9/18 | 138/135 |
| 6,032,699 | A * | 3/2000 | Cochran | F16L 11/20 | 138/104 |
| 7,258,141 | B2 * | 8/2007 | Catha | F16L 55/1653 | 264/516 |
| 8,567,448 | B2 * | 10/2013 | Stringfellow | F16L 55/1652 | 138/104 |
| 2002/0185188 | A1 * | 12/2002 | Quigley | F16L 59/143 | 138/140 |
| 2004/0089405 | A1 * | 5/2004 | Friedrich | G01M 3/28 | 156/190 |
| 2009/0236845 | A1 * | 9/2009 | Royston | F16L 47/005 | 285/14 |

* cited by examiner

PERMEATION PROCESSING SYSTEM

METHOD AND APPARATUS FOR ACHIEVING ZERO EMISSIONS OF GASEOUS SUBSTANCES IN RTP PIPELINES AND CONDUITS

This application claims priority from U.S. Provisional Application No. 63/350,228 (the '228 application) filed Jun. 8, 2022. The '228 application is incorporated by reference.

This application relates to the subject matter of the family of patents for SMARTPIPE TECHNOLOGIES® (herein referred to as "Smartpipe"), and it is applicable to Smartpipe multi layered flexible composite pipelines including:

U.S. Pat. No. 5,551,484 "Pipe Liner and Monitoring System,
U.S. Pat. No. 7,374,127 "System and Methods for Making Pipe Liners"
U.S. Pat. No. 7,258,141 "Pipe Liner Apparatus and Methods"
U.S. Pat. No. 8,567,448B2 "Methods and Systems for In-Situ Pipe Lining"
U.S. Pat. No. 8,567,450B2 "In-Situ High Pressure Pipe Manufacture"
U.S. Pat. No. 9,310,014B2 "Pipe and Systems and Methods for Making Pipe for installation in a Pipeline"
U.S. Pat. No. 9,453,606 "Movable Factory for Simultaneous Mobile Field Manufacturing and Installation of Non-Metallic Pipe"
U.S. Pat. No. 10,288,207 B2 "In Line Inspection Method and Apparatus Performing In Line Inspections"
U.S. Pat. No. 10,436,667 "In Line Inspection Method and Apparatus Performing In Line Inspections"
U.S. Pat. No. 62/981,155 "In Line Inspection Strain Device Method and Apparatus for Performing In Line Joints Inspections"
U.S. Pat. No. 1,112,049 "System and Methods for Transient Mitigation Device in Continuous Pipelines for Surge Impact Control"
62/981,155, PCT/US2021/019723 "In Line Inspection Strain Device Method and Apparatus for Performing In Line Joints Inspections"

The present invention addresses the current technology gap that exists for the management and mitigation of gaseous permeation through non-metallic and partially metallic composite pipe structures, termed Reinforced Thermoplastic Pipe ("RTP"). This novel Gaseous Zero Emissions Device ("G-ZED") is specifically designed for the inspection, detection, and management of the potential permeation of the gaseous medium within the RTP layers and beyond.

Currently, there is no such system available in the composite pipeline industry, other than in the Smartpipe suite of technologies. Other Smartpipe patents are applicable to leak detection, continuous monitoring, periodic inline inspection of line pipe and connectors, and mitigation of high-pressure transient events.

The high-strength structurally layered materials of the Smartpipe RTP are unbonded, allowing any volume of the permeated gas, however small to flow freely through the layers between the inner plastic core pipe and the protective outer cover, until it reaches a collection point, the G-ZED. The accumulation of the gaseous medium is controlled and collected to be processed, reused, or disposed of. The Gaseous Zero Emissions Device is functional for multiple forms and uses of RTP pipelines. This G-ZED novelty represents a completion of Smartpipe's monitoring system by combining Smartpipe's patented Fiber Optic and multiple embedded discrete sensors with integrated reader/activator, this novel device for monitoring and managing permeation of the gaseous substances in a single apparatus.

Other Smartpipe patents are incorporated here by reference. It should be noted that the specific product "Smartpipe" RTP is a patented invention, and that the present patent application conforms to the extended art of the invention where this invention compliments the original product, adding a novel application to fill an existing industry technology gap: the monitoring, collection and control of composite pipeline permeation of gaseous substances utilizing a composite pipe-based device, the G-ZED. It is important to note that the system is in continual monitoring mode where it is possible for the operator to obtain the data at any time. This novel system has not been available in the composite pipe (RTP) industry until now. This novel system is designed to be integrated with the industry's existing and future RTP pipeline systems, to be installed on new RTP pipe or retrofitted onto an existing installed RTP pipeline.

BACKGROUND

The Reinforced Thermoplastic Pipe industry has grown exponentially over the past 25 years. These flexible, high-pressure systems transport most anything that has been traditionally transported by steel pipelines. RTP has many advantages over steel pipelines, including flexibility, constructability in difficult environments, light weight, non-corroding materials and in the case of Smartpipe, fiber-optic monitoring cables and embedded sensors along the full length of the pipeline to monitor and inspect its structural health. There is, however, a feature of composite pipe that is not a positive, the permeation of gas through the composite structure, which releases to atmosphere or, in the case of RTP installed inside a steel pipe, accumulation of the gas in the steel pipe's annular space. This accumulation poses significant safety risk, and the industry has previously vented the gas to the atmosphere by strategically placed vents along the length of the steel pipe. This procedure is no longer acceptable to the public or the industry regulatory bodies. While some RTP products have reduced or claimed to eliminate in its entirety the permeation of gases, due to unforeseen quality control or manufacturing defects, will go undetected, as there is no other process to detect or safely remediate the presence of gases and no other RTP products are monitored or inspected while in operation.

This invention is designed to address these problems that are known to presently exist in the composite RTP pipeline industry. The engineered G-ZED system functions to prevent gaseous substances' uncontrolled accumulation, release to the atmosphere and potential catastrophic failure of the pipeline. Personal safety and environmental security are threatened by pipelines that cannot be monitored and periodically inspected by operators and pipeline regulators. This invention relates to a method and structurally inventive system-construction or mechanism to facilitate such monitoring and inspection of the composite pipe, and channels permeated gases to a collection point where they are then re-injected into the pipeline, re-used to power necessary appurtenances, or disposed of. This invention contains embedded sensors for detection, monitoring, equipment activation and deactivation for gaseous substances' containment, reuse, or removal. The system's components are designed and assembled as a package that includes sensors, method of attachments designed to the specific pipeline requirements, and are user friendly for installation and operation in existing and new pipelines.

This novel G-ZED device is not currently available in the industry. The novelty of this invention is found to be most useful in RTP pipelines where there is a need to detect and eliminate gaseous substances that permeate through the wall of the pipelines. Industry standards or performance allowances by authorities that regulate pipelines require zero emissivity performance for the pipelines. Uncontrolled accumulation and release of gaseous permeation, due to the absence of continuous monitoring and effective management of the accumulated gas is unacceptable and as a result becomes a serious safety hazard to both the public and environment.

The G-ZED inventive system is equipped with electronic monitoring sensors which determine the permeated gaseous accumulated quantities, pressure or potential leaks as a part of the pipeline's total monitoring and inspection dataset. The G-ZED is tested and certified as part of the system's manufacturing and subsequent operational procedures.

The Smartpipe G-ZED system for detection and management is a method of detecting the presence and volume of the gaseous accumulation, where the G-ZED device collects such data and either automatically evacuates the accumulated gas, or transmits the data to the operator, who then activates the system to eliminate the gaseous containment.

This safeguards and informs the G-ZED operator to recognize the condition of the gaseous permeation and accumulation and the performance of the necessary steps for its containment, reuse, or removal. The system can be programmed to automatically perform the removal, reuse or containment functions, or the operator can manually perform the operations based on predetermined metrics.

Additionally, due to the high-strength and flexibility of the composite pipelines, it is also feasible to install multiple nested pipes within pipes, and as such the annular spaces become safe containment and flow channels for the permeated gases. This is especially important for pipelines in hard to access, high consequence locations.

SUMMARY OF THE INVENTION

The inventive system and methods for net zero fugitive emissions in pipelines by means of the G-ZED is a novel method and apparatus which is presently non-existent in the pipeline industry. The G-ZED is an addition to the previously issued patent for the ILI monitoring system, and it applies to RIP pipe and the outside environment in monitoring of the pipelines for hazardous gases.

The G-ZED completes the Smartpipe composite pipe system as a self-contained, connected, state of the art pipeline, incorporating the monitoring, collection, reuse, or disposal of permeated gas of any type. This novel system channels the permeant through the reinforcement layers, sealing it inside Smartpipe's outer cover until it reaches a collection point, thereby eliminating fugitive emissions of hazardous gases of any type from the Smartpipe or other RTP system.

The inventive G-ZED system is a non-intrusive component device, and as a fully assembled piece, it is installed at one or more locations along the pipeline. The G-ZED will monitor and transmit data relative to the volume, flow, and pressure of the collected gas. The designed G-ZED system is equipped with multiple sensor devices, positioned in the best configuration to provide crucial information to the operator for appropriate action to be taken, maintaining optimal structural health of the pipeline. The G-ZED device cooperates with the in-line inspection system to provide full control of the pipeline. The system is replaceable, if necessary. The system can be installed outside of the pipeline performing the same function if the operator of the pipeline deems it necessary for such operation.

The inventive system provides the G-ZED as a pre-manufactured device for pipelines as may be required by customers.

An important feature of this inventive G-ZED device is to function as the mechanism for facilitating use of the gaseous substances as accumulated, removed, contained, stored, processed by catalytic converter or other relevant methods, re-used or reinjected into an operating pipeline. The G-ZED device will address current and future regulatory codes that require net-zero-emissions. The G-ZED product can be implemented at the time of the original construction of a pipeline, or at any time requiring the pipeline to be equipped with such a device.

The inventive G-ZED system for pipelines is described with the inclusions of the drawings and items or components of this "first-to-tile" document designated as the figures from 1 through 12. The final submission proposes additions if needed to complete a full function of this application.

It is an objective of this G-ZED invention to integrate this system with the entire inline inspection system and all its components.

The novel G-ZED device is assembled, ready for transportation to the site for installation, constructed at the connecting point with a pipeline and conduits in continuation, which may be a new, rehabilitated, reconstructed, or stand-alone pipeline.

It is further intended that multiple installation configurations are possible, such as above ground, within a host pipeline, direct buried underground, in multiple conduits, culverts, subsea, and in a variety of industrial applications in conduits and other industrial applications.

It is further intended that the novel use of this inventive system is also applicable in Smartpipe "C"-shape reduced cross sections for later processing in the pipelines, and in a multiple configuration of concentric, multiple smaller pipes within pipe combinations, and of the shapes in reduction as documented in other Smartpipe patents.

It is further intended that the novel method of the new pipeline designed structures may require a multiplicity of the inner composite liners in a concentric configuration. G-ZED devices may be installed inside the layers, above or below layers, on the host pipe, and inside the cavities, to assess the condition of the pipe and related spaces around the pipeline to its position underground, above ground and in an extraneous condition, such as liquids.

It is further intended that proprietary computer hardware and software is also a part of the inventive system.

It is further intended that this novel method of the invention, its engineering and mechanics are applicable to specific requirements in a specific connection in a pipeline and can be calculated in advance to demonstrate such function of the pipeline. A custom made In Line Inspection Strain Device ("ILISD") will allow for variable combination of the constructed elements.

Novelties of the Invention and Innovation

The present state of the RTP industry has no provision for the types of devices constructed with pipelines for gaseous permeation collection, reuse, and containment. The reference is noted that a prior art invention Smartpipe is used in the manufacturing of the G-ZED product. The system is suitable for reinforced thermoplastic composite pipe and other non-metallic or partially metallic pipelines and conduits. This novel G-ZED device has not been previously available in the industry.

The novelty of this inventive system is that the G-ZED device structure and its component members are designed specifically for the acceptance of the connectors suitable and specific to RTP pipes, specifically Smartpipe.

The novelty of the structure of G-ZED device is that it is constructed in a multiplicity of combinations and connections to Smartpipe.

The inventive G-ZED system's data collection allows for the assessment of the condition of the gaseous accumulation indicating the need for means of reuse or disposal.

The novelty of this inventive G-ZED system is in its advantage where unbonded composite pipelines' reinforcement layers contain voids, as a primary permeation flow channel and containment, and the host pipelines' annular space as the secondary containment. Bonded composite pipe has no such reinforcement layer flow channel, and the permeated gases are collected and channeled through the host pipe annular space, if installed in a host pipeline. The flow and elimination of the gaseous containment is collected by the G-LED device from within the RTP layers and the annular space of the host pipe, to be facilitated within the same device. The critical features of such a system are not currently available in today's industry.

The novelty of the invention is in the ability of the G-ZED system to perform its function in separate and combined interactive work with the reinjection into a pipeline, collection, reuse, or disposal by other means.

BACKGROUND OF THE INVENTION AND INNOVATION

The invention relates to the G-ZED devices made from CRA (corrosion resistant alloy) or non-metallic composite pipe chamber, or combined concentric chambers, with sensors and compartments for collection of the gases, differential pressurization, and various means of reclaimed gas reintroduction into the existing pipeline. The other options are to remove and contain in system storage chambers the collected gaseous substance, or to transfer into a separate pipeline system.

The G-ZED technology is made available in conjunction with the prior art for making the composite pipelines.

This technology, as it relates to the composite pipelines, develop as line pipes in the "C" formed sections as well as other patented cross sections, as referenced here as "form shaped sections", and specifically noted in the Smartpipe patents. The free standing RTP pipes are also the subject for use of this G-ZED device.

The form shaped Smartpipe RTP pipes are made with a reduced area in cross section from the host pipe. They replace a full function of the host pipe, but the host pipe provides in situ annulus that is a barrier to the permeation of the gaseous substance to the surrounding ground. The G-LED device is primarily designed to contain the permeation from the RTP pipe alone, but the device also allows for collection of the gaseous substance from both spaces.

This inventive system of G-ZED devices, is capable of being installed in a variety of ways, such as at the end of the continuous RTP pipe, terminating with a special connector; and connected to the CRA (corrosion resistant alloy) or non-metallic composite pipe section, where a portion of the free standing RTP pipe is exposed to the cavity of the chamber, allowing for the free flow of gas permeation into the chamber. The collected gaseous substance would then be conveyed into the CRA (corrosion resistant alloy) or non-metallic composite fitting section of the continuous pipe, which can be lined with another section of the RTP pipe. The intermediate means of the gaseous substance evacuation can be also devised by means of the outside collection chamber or redirection of the collected gaseous substance into a separate pipeline.

DETAILED DESCRIPTION OF THE INVENTION

Figure 1:
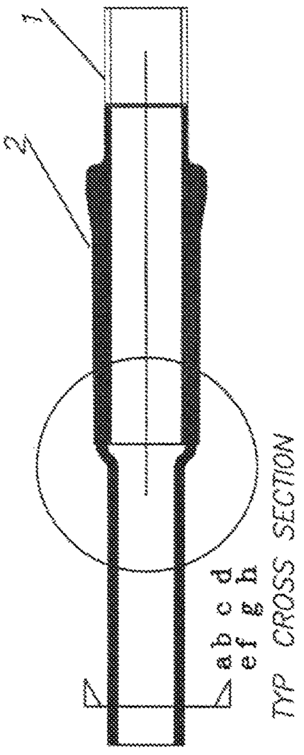
FIG. 1 is a longitudinal cross section of the permeation stem installation. The existing pipe is fitted with a connector specific to RTP connectivity.

FIG. 1 shows the installation of a permeation stem by connecting a section of existing steel pipe 1 into a connector 2 specific to an RTP.

Figure 2:
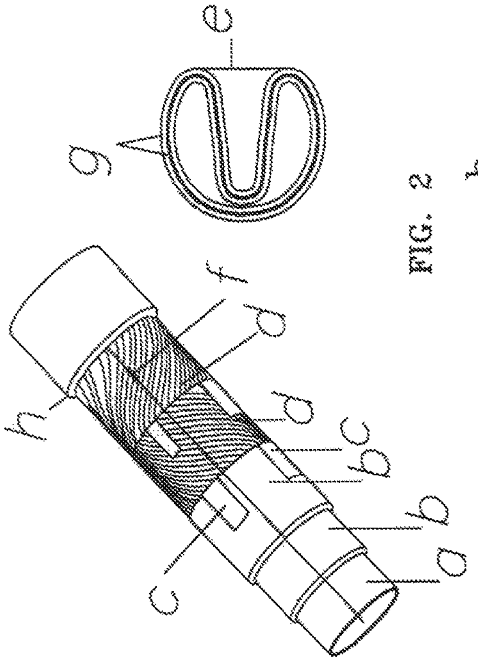
FIG. 2 is an isometric depiction of a typical profile of RTP with a cross section of "shape formed" pipe in "C" formation.
Figure 2A:
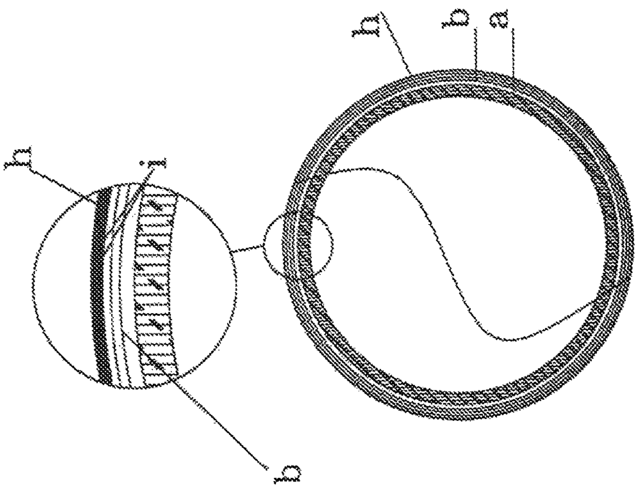
FIG. 2*a* is an expanded cross section of the RIP depicted in FIG. 2.

FIGS. 2 and 2*a* provide details on the multi-layered components of a composite Smartpipe RTP product including a cross section of "shape formed" pipe in "C" formation with cross section for later processing into pipelines. FIGS. 2 and 2*a* represent Smartpipe technology and show a typical section of the composite layers from the interior line pipe, high strength tapes, and the protective layer. The components are depicted as follows:

a. Interior liner pipe;
b. High strength reinforced Smartpipe RTP;
c. High strength pulling tapes with embedded woven fabric sensors;
d. Wrapping layers helical and circular;
e. Covering assembly tapes;
f. Sensors and readers for various pipeline functions;
g. "shape formed" pipe in "C" formation;
h. Protective layer with instrumentation fiber optics, full containment no permeation into annulus (host pipe or stand-alone pipe);
i. Metallic non permeable component of the protective layer; impregnated flexible layer cured post installation; high strength nano enhanced barrier, composed layer to contain gas within the RTP.

Figure 3:
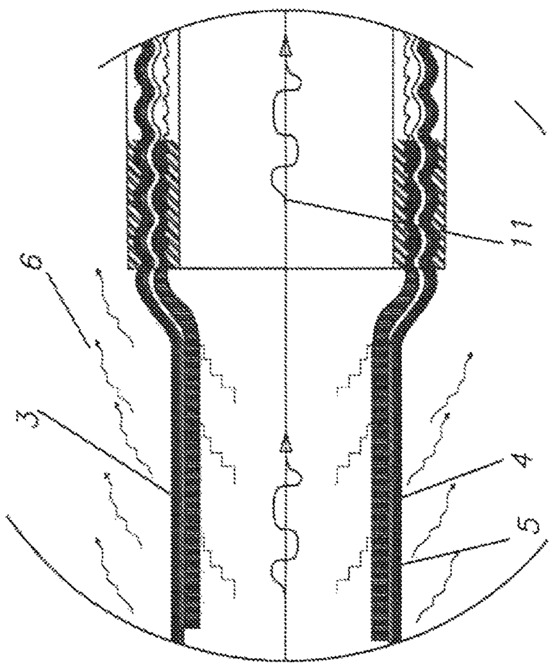
FIG. 3 is a longitudinal cross-sectional detail of the permeation stem installation showing the RTP configured within the proprietary connector. The illustration represents the flow of the gaseous substance permeating through the pipe.

The illustration of FIG. 3 is an enlarged detail from FIG. 1 represents the flow of the gaseous substance permeating through the RTP and provides a detail 3 of a free standing pipe with gas permeation 6 contained within the reinforcement layers. The detail 4 shows the reinforcement layers permeated by the gas within the voids and sensors 5 at the outer cover layer detecting the gas permeation. The gas flow movement is towards a containment chamber. Detail 6 indicates gas permeation beyond reinforcement layers migrating to the containment chamber. Direction of continuous gas flow in the pipe is shown by the arrow 11.

Figure 4:
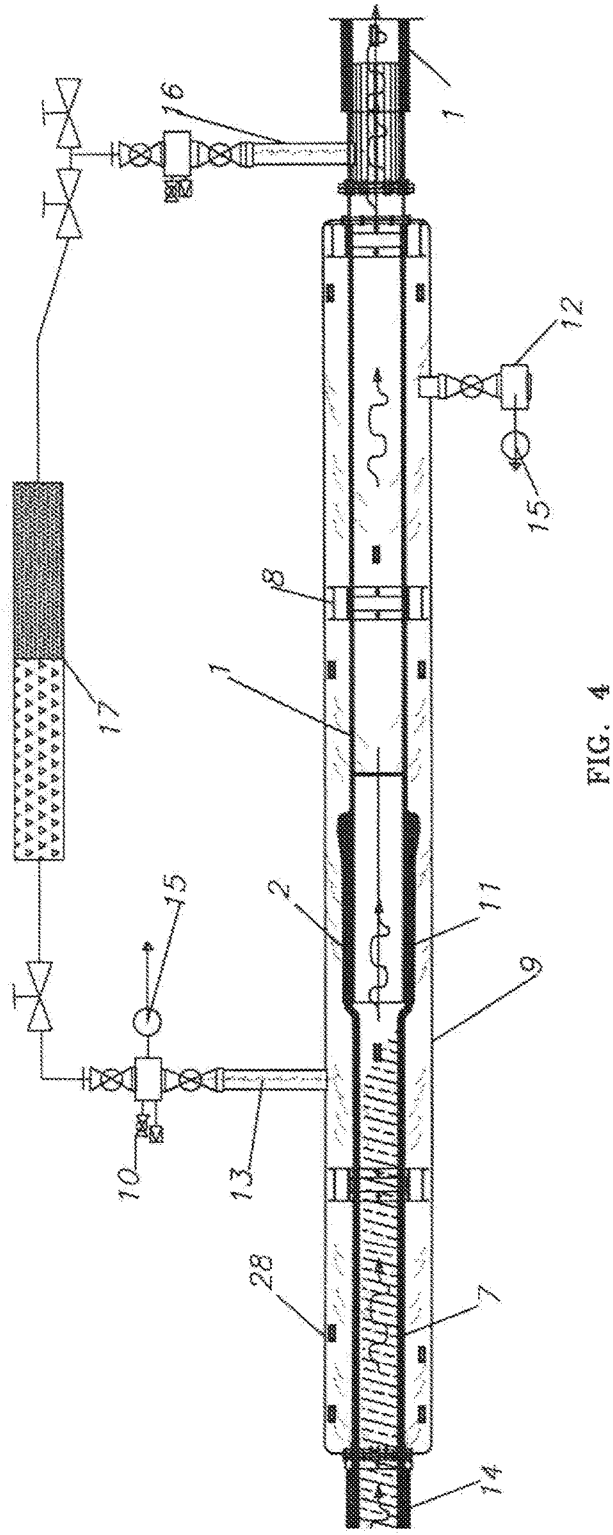
FIG. 4 is a depiction of the permeation gas chamber assembly with the inventive G-ZED device engaged over the assembly with several components of the pipeline.

A typical permeation gas chamber assembly as part of the inventive G-ZED system is shown in FIG. 4. with a CRA (corrosion resistant alloy) or non-metallic composite pipe chamber 9 concentrically engaged to collect gas permeation beyond the reinforcement layers 7 of the section of RTP exposed within the chamber 9. Also shown is the inlet part of the steel pipe 1 connected to and extending into the CRA (corrosion resistant alloy) or non-metallic composite pipe chamber 9. The steel pipe extending into the CRA (corrosion resistant alloy) or non-metallic composite pipe chamber 9 is supported by centralizers 8. The RTP section exposed within the chamber 9 joins the existing steel pipe 1 by a connector 2. Further in continuation is the steel pipe connected piece to the exit end from the CRA (corrosion resistant alloy) or non-metallic composite chamber and connected to another connector-fitting the continuation of the pipeline. The section of the steel fitting is the point of directing the reclaimed gaseous substance 16 to be pressurized from the G-ZED into an active pipeline.

As further shown in FIG. 4, the CRA (corrosion resistant alloy) or non-metallic composite pipe chamber 9 has an inlet end 9*a* and an exit end 9*b*. At the inlet end 9*a* a steel host pipe 14*a* containing an RTP would be affixed with the RTP extending into the chamber 9 to join the existing steel pipe 1 by a connector 2. At the inlet end 9*a* annulus gas flow 14 between the RTP and steel host pipe 14*a* would merge and flow into the chamber 9. Continuous gas flow 11 moves from the inlet end 9*a* to the exit end 9*b*. Further in continuation is the steel pipe connected piece 1 from the exit end 9*b* of the CRA (corrosion resistant alloy) or non-metallic composite chamber and connected to another connector-fitting to the continuation of the pipeline 1. The connector-fitting is the point of the reclaimed gaseous substance 16 to be pressurized from the G-ZED into an active pipeline. Non-reversible gas flow 13 from the chamber 9 would be piped to an assembly of fittings and equipment 10 to facilitate gas evacuation from the chamber 9 and direction to buster compression chambers 17 to provide for separation of pressure before directing the reclaimed gas pressurized 16 back into the existing steel pipe 1. Pressure monitoring 15 for SCADA (Supervisory Control and Data Acquisition) would be provided at the assembly of fittings and equipment 10 and the chamber 9 as well as vacuum pressure inducement 12 for flow increase of the permeated gas and multiple embedded discrete sensors 28 are shown in the chamber.

Figure 5:
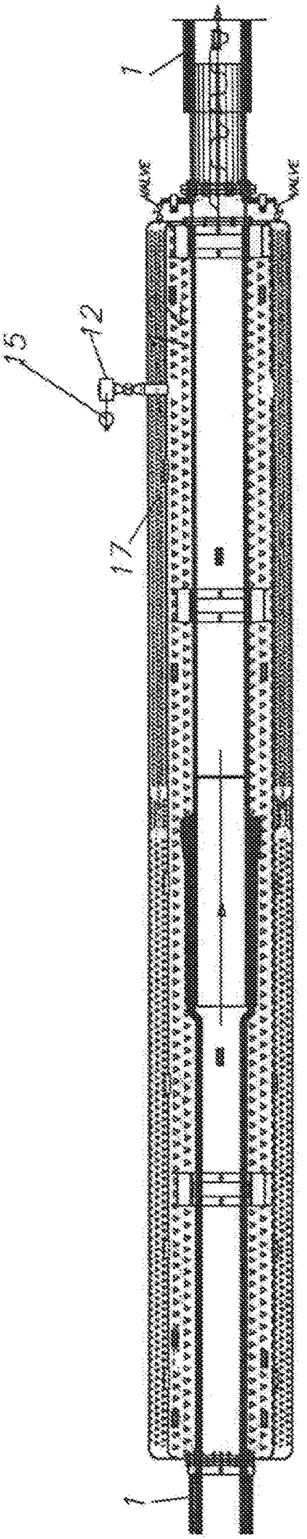
FIG. 5 is a longitudinal section of the permeation gas chamber assembly with venturi concentric pressurization showing the position of the G-ZED device parallel to the primary device.

FIG. 5 shows an alternative embodiment of the permeation gas chamber with venturi concentric pressurization 17, providing a second continuous chamber for gaseous substance containment, pressurization, and evacuation to one of the means of the collection or continuation with the medium in transport.

Figure 6:
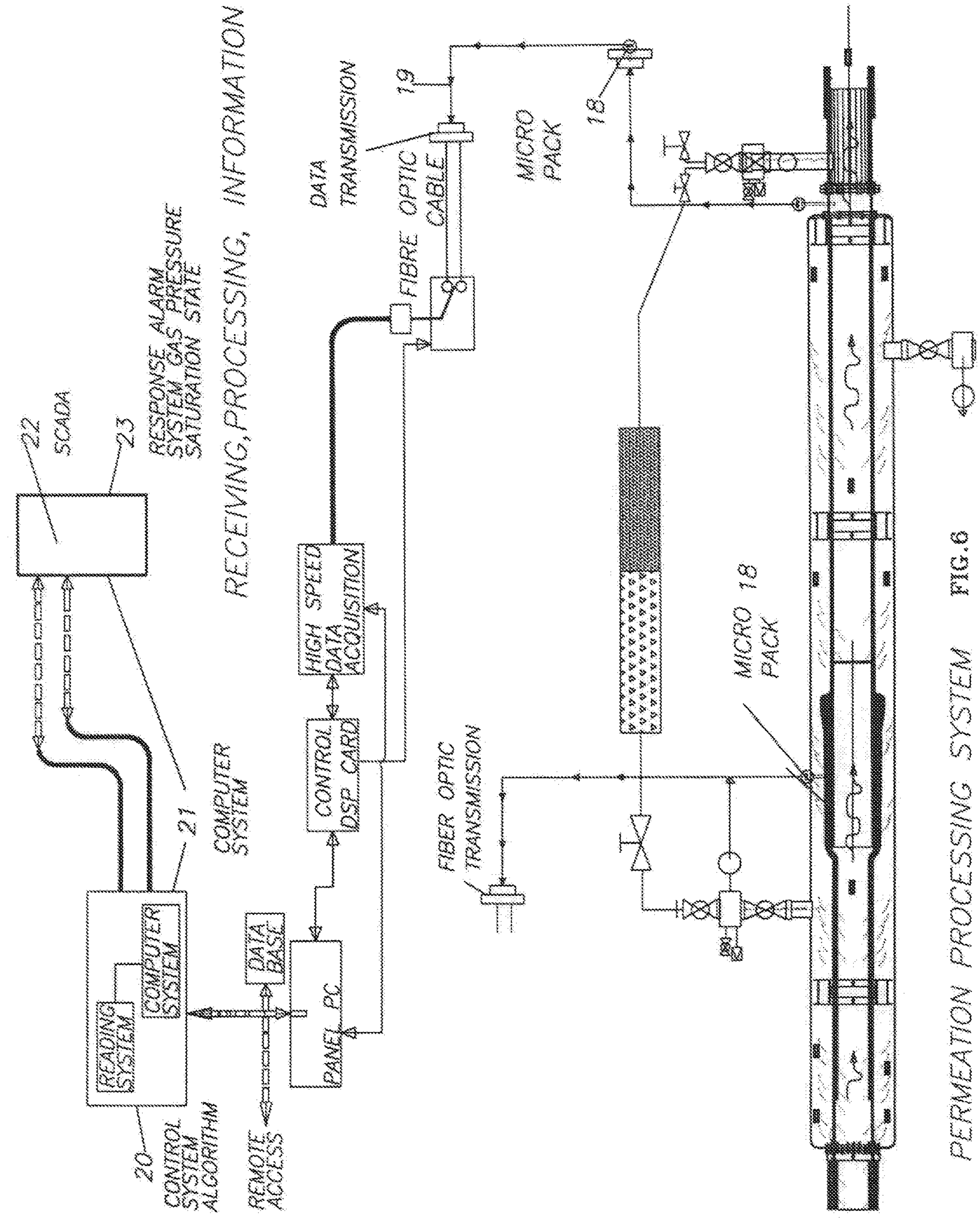
FIG. 6 is a flow diagram depiction of the G-ZED device permeation processing system with embedded sensors, electronics and fiber optics for receiving, processing and gathering information at the connected ports via the Scada or other computerized means.

The flow diagram depiction in FIG. 6 shows a permeation processing system as would be applied to the inventive G-ZED system generally as shown in FIG. 4. Shown are micro packs 18 used in conjunction with data and fiber optic transmission 19. This system of monitoring has several technological features where it could be combined with sensors, fiber optics and other means available in contemporary technologies. Shown is a control system algorithm 20, computer system 21, SCADA 22 and response alarm 23.

Figure 7:
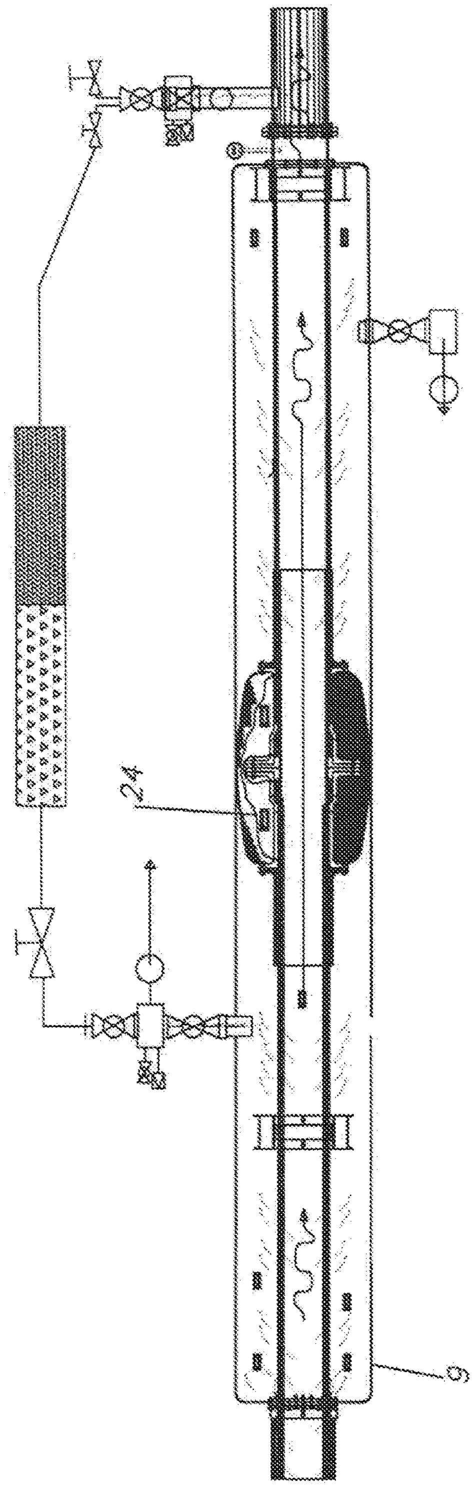
FIG. 7 is a longitudinal cross sectional depiction of the Smartpipe In Line Inspection Strain Device ("ILISD") device combined with utilization of the G-ZED permeation device chamber where the continuation of the monitoring system is fully functional within the CRA (corrosion resistant alloy) or non-metallic composite chamber, and the gaseous substance is collected within the same chamber.
Figure 8:
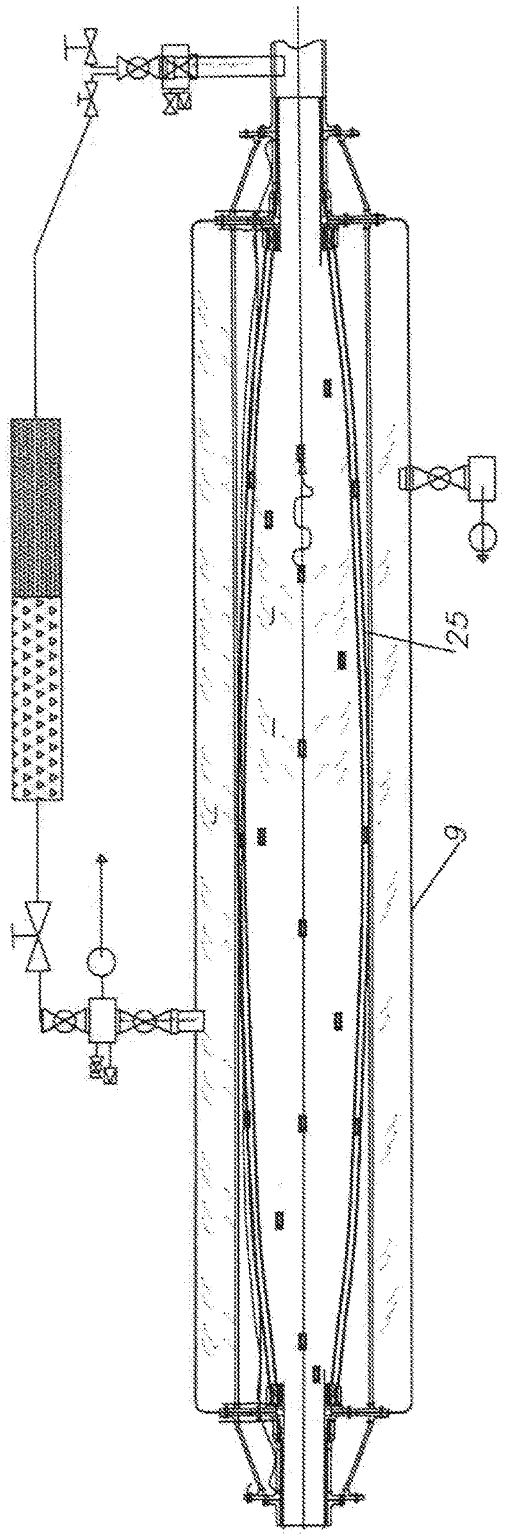
FIG. 8 is a longitudinal cross sectional depiction of the Smartpipe Transient Mitigation Device ("TMD") device positioned within the concentric chamber for gaseous substance containment of the G-ZED permeation device.

FIG. 7 shows a Smartpipe In Line Inspection Strain Device ("ILISD") device 24 used in combination with the inventive G-ZED system within the permeation chamber 9 to afford continuous pipeline monitoring with combined data for permeation. Likewise in FIG. 8, a Smartpipe Transient Mitigation Device ("TMD") device 25 is used in combination within the permeation chamber 9 to function for pressure mitigation.

Figure 9:
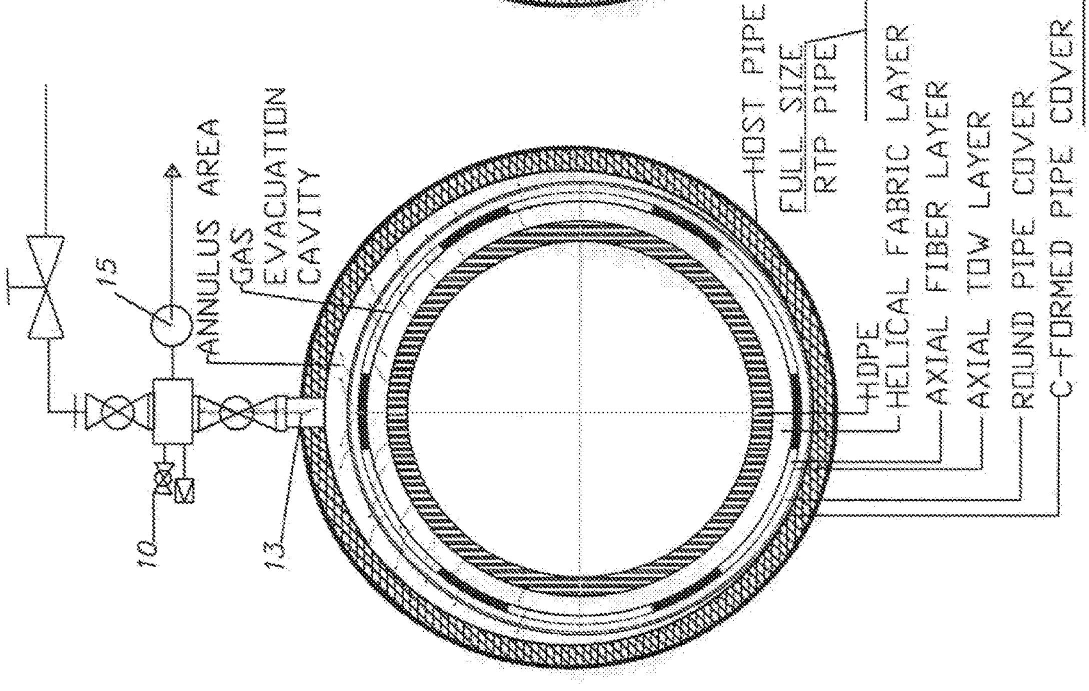
FIG. 9 is a cross sectional depiction of the G-ZED continuous pipe chamber as a concentric pipe in single and multiple configurations, providing for the annulus spaces evacuation of the gaseous substances, which may escape from inner pipeline into each subsequent cavity.
Figure 10:
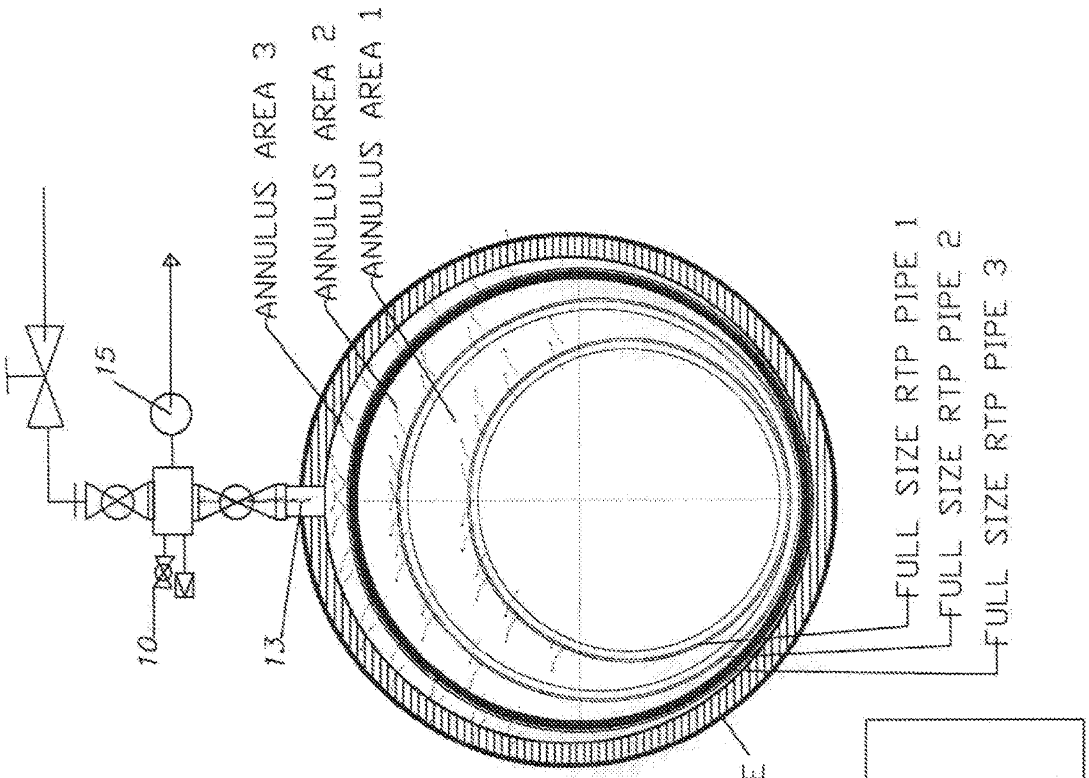
FIG. 10 is a cross sectional depiction of the G-ZED continuous pipe combining multiple pipes within the pipe and the multiple annulus spaces that can sequentially collect gaseous substances, and safely provide for their full evacuation.

In FIGS. 9 and 10 are shown permeation sections of both singular and multiple RTPs with singular and multiple annulus areas. In the case of a singular annulus non-reversible gas flow 13 can be routed through the host pipe to an assembly 10 to facilitate gas evacuation, and in the case of multiple annular spaces, each space will collect gas and evacuate the gas toward a collection chamber.

Figure 11:
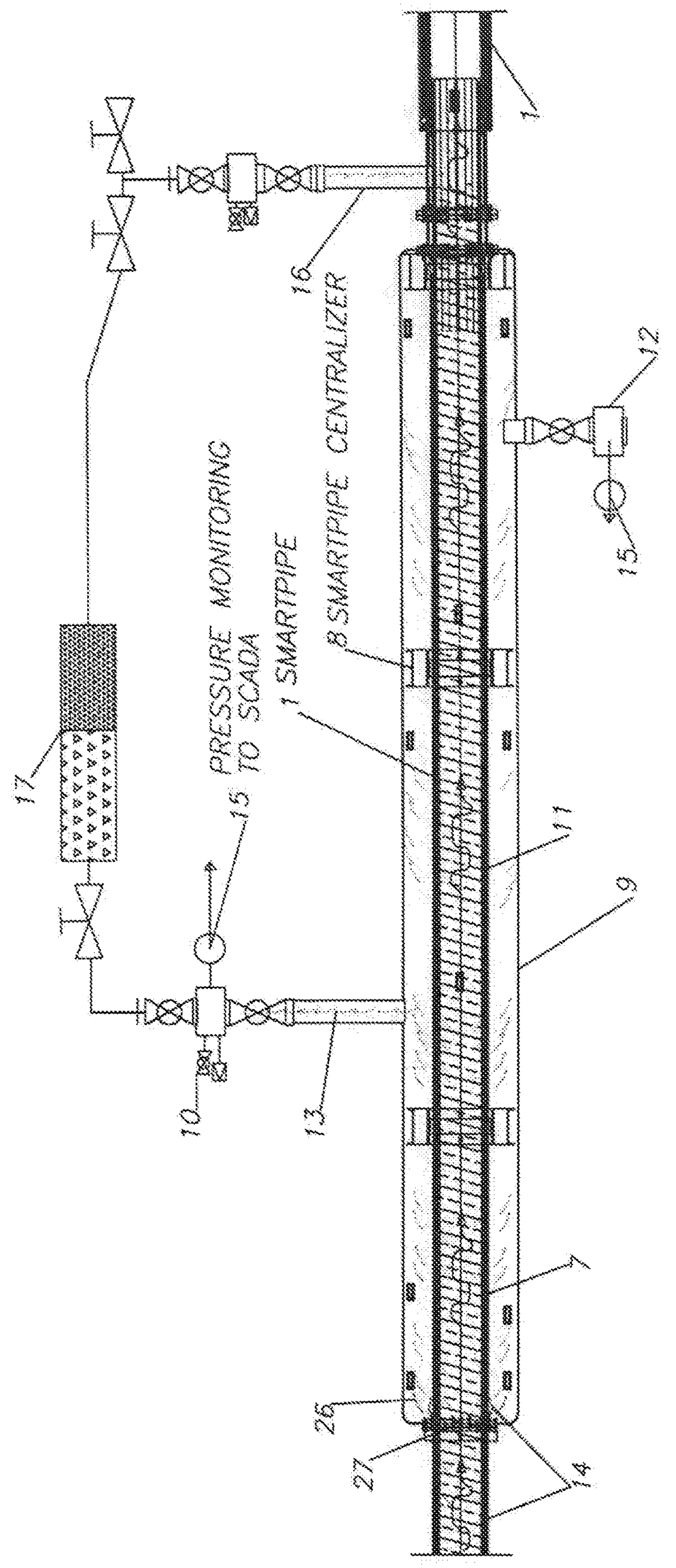
FIG. 11 is a depiction of the G-ZED continuous free-standing pipe with a single containment chamber.

A permeation gas chamber assembly as part of the inventive G-ZED system is shown in FIG. 11 with a free standing RTP 7 and a single containment chamber 9, for the gaseous substances collected from the specially composed reinforcement cover assembly, which provides for all gaseous substances conveyed only through the voids within the reinforcing layers. The collection nonreversible device 13 at the beginning of the chamber 7 serves as a transitional piece to revert the gaseous substance from the permeable reinforcing layers of the pipe cover, which conveys the gaseous substance into the chamber for evacuation or reinjection, while the free-standing pipeline 7 remains functional. The gaseous substances then can be injected or evacuated from the pipeline by means of pressurization or elimination by the outside equipment. This free-standing pipe is self-dependent.

Figure 12:
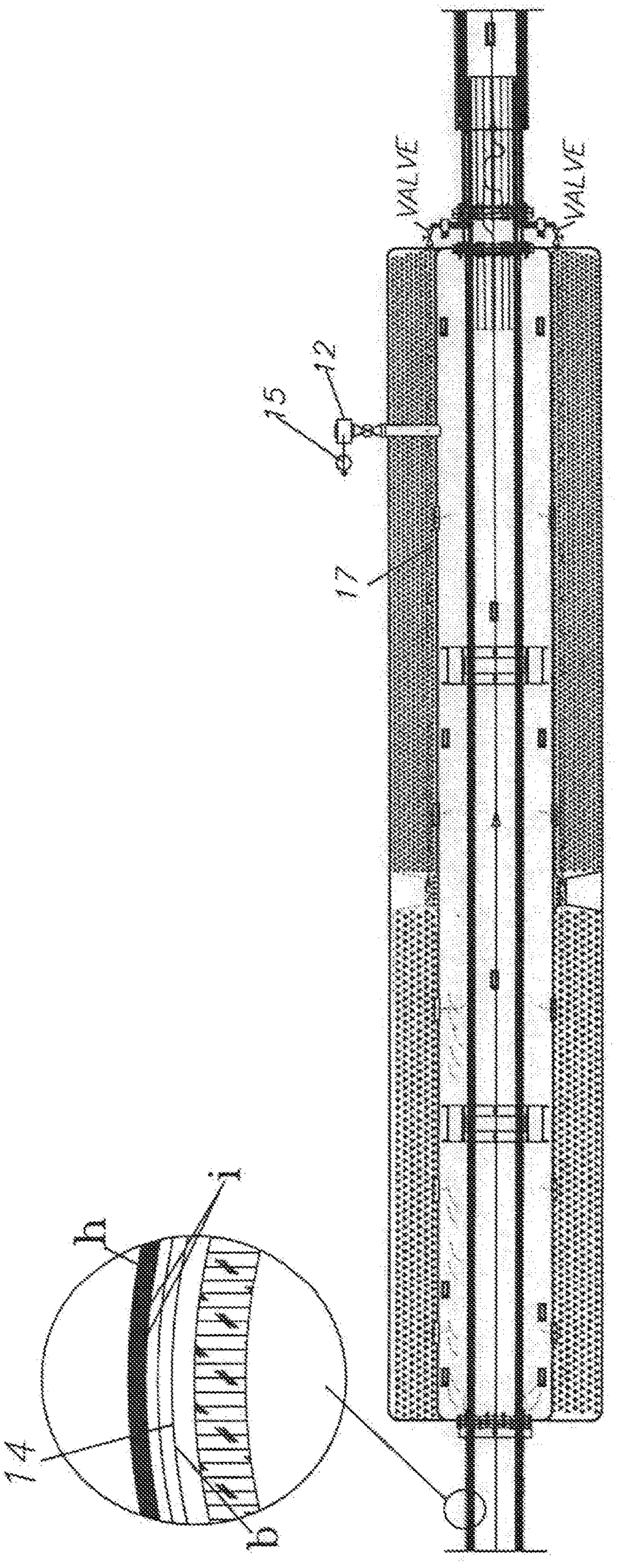
FIG. 12 is a depiction of the G-ZED continuous free-standing pipe with two or more containment chambers.

A permeation gas chamber assembly as part of the inventive G-ZED system is shown in FIG. 12 with continuous free-standing pipe and two or more containment chambers 17, for the gaseous substances collected from the specially composed reinforcement cover assembly, which contains at least one permeation barrier layer of metallic or non-metallic material, providing for all gaseous substances to be safely conveyed through the voids within the reinforcing layers. The compression chambers are increased to provide for the separation of pressures. The cross sectional blow up of the RTP layers shows the metallic non-permeable component i of the protective layer h. It should be noted that the RTP full containment within the layers have variable densities and voids up to 40%

We claim:

1. A permeation device for the management and mitigation of gaseous permeation through and within the layers of multilayered composite pipe, and prevention of gaseous substances' undetected and uncontrolled accumulation in an annular space between the multilayered composite pipe and a host steel pipeline, and prevention of release to the atmosphere and potential catastrophic failure of the pipeline, comprising:

a. a cylindrical permeation gas chamber with a cavity and an outer surface having an inlet end and an exit end and of diameter greater than a host steel pipeline within which is installed a continuous multilayered composite pipe having an end and an outer layer, said multilayered composite pipe end extending into the permeation gas chamber at the inlet end with the outer layer of the multilayered composite pipe exposed to the cavity of the permeation gas chamber to allow migration of gas permeation from the multilayered composite pipe into the permeation gas chamber;

b. a steel pipe connecting section with a connecting end extending into the permeation gas chamber at the exit end and said connecting end joining the multilayered composite pipe end with a connector specific to the respective diameters of the multilayered composite pipe and the steel pipe with continuous gas flow through the multilayered composite pipe and the steel pipe proceeding from the entry end to the exit end;

c. at least one centralizer to support the steel pipe connecting section within the permeation gas chamber;

d. at least one non-reversible permeated gas flow pipe attached to the outer surface of the permeation gas chamber directed to an assembly of fittings with pressure monitoring to SCADA to facilitate the evacuation of permeated gas from the permeation chamber and directed to at least one compression chamber for pressure separation and then directed to a pipe fitting connected to the steel pipe connecting section at the outside of the exit end of the permeation gas chamber to inject reclaimed pressurized permeated gas into the existing steel pipe gas flow;

e. pressure monitoring to SCADA from the permeation gas chamber;

g. fiber optic transmission, data transmission, and computer system for receiving and processing information;

h. multiple embedded discrete sensors with integrated reader/activator.

2. The permeation device of claim 1 where the cylindrical permeation gas chamber has venturi concentric pressurization.

3. The permeation device of claim 1 where the continuous multilayered composite pipe extends continuously through the permeation gas chamber from entry end to exit end where the entire outer layer of the multilayered composite pipe in the permeation gas chamber is exposed to the cavity of the permeation gas chamber to allow migration of gas permeation from the multilayered composite pipe into the permeation gas chamber.

4. The permeation device of claim 3 where the cylindrical permeation gas chamber has venturi concentric pressurization.

5. The permeation device of claim 3 where the continuous multilayered composite pipe may include multiple pipes of consecutive smaller diameters run one in another creating an annulus area between each pipe, which annulus areas would each collect permeated gas to be evacuated to the permeation gas chamber.

6. A method of management and mitigation of gaseous permeation through and within the layers of multilayered composite pipe, and prevention of gaseous substances' uncontrolled accumulation in an annular space between the multilayered composite pipe and a host steel pipeline, and prevention of release to the atmosphere and potential catastrophic failure of the pipeline, comprising the steps of:

a. installing a cylindrical permeation gas chamber with a cavity and an outer surface having an inlet end and an exit end and of diameter greater than a host steel pipeline within which is installed a continuous multilayered composite pipe having an end and an outer layer, said multilayered composite pipe end extending into the permeation gas chamber at the inlet end with the outer layer of the multilayered composite pipe exposed to the cavity of the permeation gas chamber to allow migration of gas permeation from the multilayered composite pipe into the permeation gas chamber;

a steel pipe connecting section with a connecting end extending into the permeation gas chamber at the exit end and said connecting end joining the multilayered composite pipe end with a connector specific to the respective diameters of the multilayered composite pipe and the steel pipe with continuous gas flow through the multilayered composite pipe and the steel pipe proceeding from the entry end to the exit end;

at least one centralizer to support the steel pipe connecting section within the permeation gas chamber;

at least one non-reversible permeated gas flow pipe attached to the outer surface of the permeation gas chamber directed to an assembly of fittings with pressure monitoring to SCADA to facilitate the evacuation of permeated gas from the permeation chamber and directed to at least one compression chamber for pressure separation and then directed to a pipe fitting connected to the steel pipe connecting section at the outside of the exit end of the permeation gas chamber to inject reclaimed pressurized permeated gas into the existing steel pipe gas flow, fiber optic transmission, data transmission, and computer system for receiving and processing information, and;

embedding multiple discrete sensors with integrated reader/activator;

c. monitor pressure in the permeation gas chamber;

d. allow migration of gas permeation from the multilayered composite pipe into the permeation gas chamber;

e. direct permeated gas from permeated gas chamber to at least one compression chamber and inject reclaimed permeated gas into the steel pipeline or storage.

7. The method of claim 6 where the installed cylindrical permeation gas chamber has venturi concentric pressurization.

8. The method of claim 6 where the continuous multilayered composite pipe extends continuously through the installed permeation gas chamber from entry end to exit end where the entire outer layer of the multilayered composite pipe in the permeation gas chamber is exposed to the cavity of the permeation gas chamber to allow migration of gas permeation from the multilayered composite pipe into the permeation gas chamber.

9. The method of claim 8 where the installed cylindrical permeation gas chamber has venturi concentric pressurization.

10. The method of claim 8 where the continuous multi-layered composite pipe may include multiple pipes of consecutive smaller diameters run one in another creating an annulus area between each pipe, which annulus areas would each collect permeated gas to be evacuated to the installed permeation gas chamber.

* * * * *